UNITED STATES PATENT OFFICE.

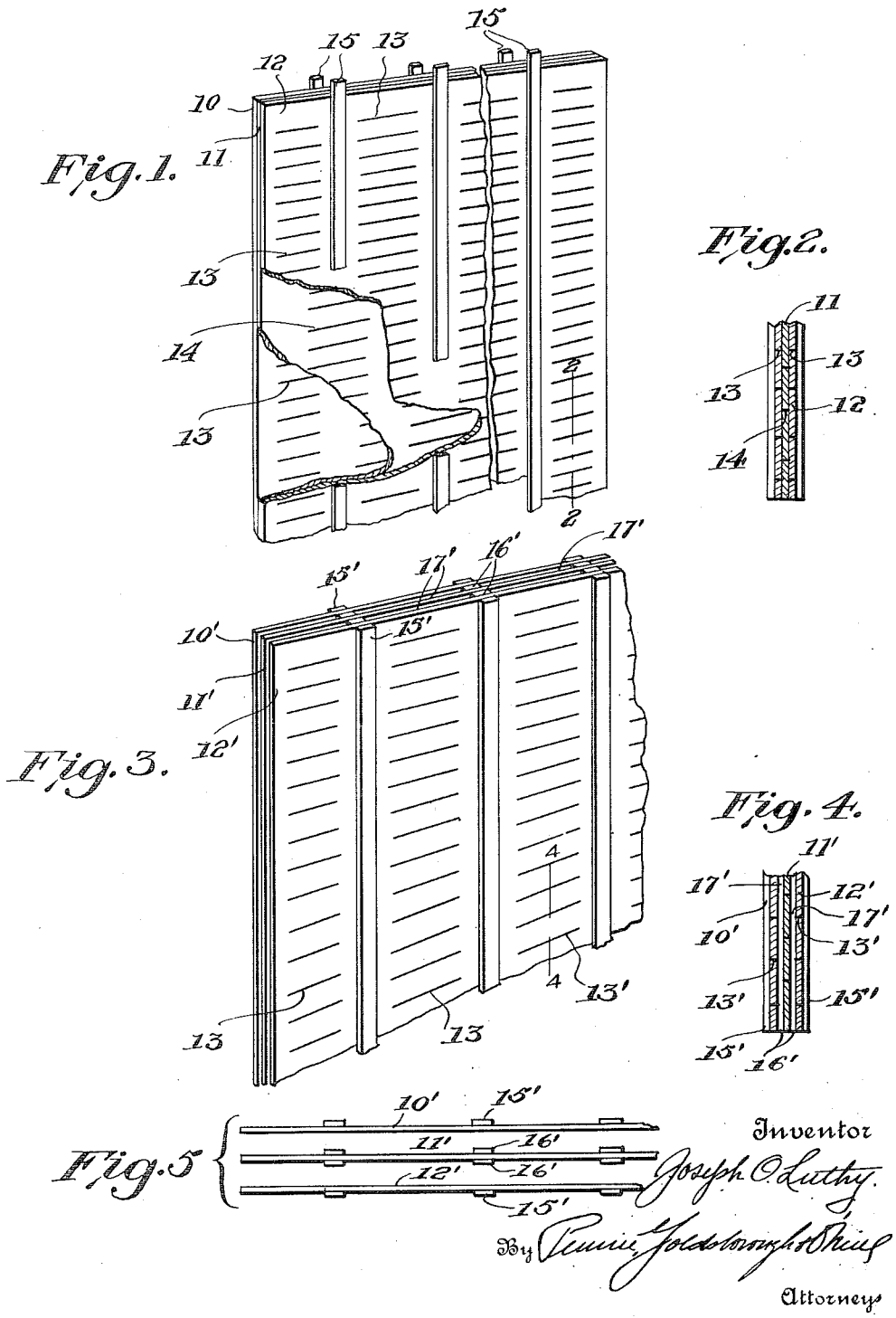

JOSEPH O. LUTHY, OF SAN ANTONIO, TEXAS.

SEPARATOR FOR SECONDARY BATTERIES.

1,305,658.   Specification of Letters Patent.   Patented June 3, 1919.

Application filed January 16, 1919. Serial No. 271,354.

*To all whom it may concern:*

Be it known that I, JOSEPH O. LUTHY, a citizen of Switzerland, residing at San Antonio, in the county of Bexar and State of Texas, have invented certain new and useful Improvements in Separators for Secondary Batteries; and I do hereby declare the following to be a full, clear, and exact description of the invention, such as will enable others skilled in the art to which it appertains to make and use the same.

This invention relates to a separator for secondary batteries.

The primary object of the invention resides in the provision of a separator which will permit the free flow of the fluid from one battery plate to the other, yet one which will hold the active material in place and will interrupt the passage of the free active material and cause it to be deposited at the bottom of the cell.

A further object lies in so constructing the separator that the active material will not accumulate on the separator and consequently will not cause a short circuiting of the cell.

In the drawings:

Figure 1 is a perspective view of a separator formed in accordance with my invention, portions of two of the plates thereof being broken away to illustrate the relation of the slits.

Fig. 2 is a vertical sectional view showing the relation of the slits.

Fig. 3 is a fragmental perspective view of a modified form of separator.

Fig. 4 is a fragmental vertical section of the same, and

Fig. 5 is an exploded view of the separator.

The device, in the form illustrated in Fig. 1 includes a series of, preferably, three plates 10, 11 and 12, which are of the usual rectangular form, but which, however, may be of any other desirable form. These plates 10, 11 and 12 are arranged with their faces contiguous and are secured together in any suitable manner to form a complete laminated separator. The plates are made preferably of celluloid, but it will, of course, be understood that they may be made of any other desirable material.

The outside plates 10 and 12 are each provided with a plurality of openings such as slits 13 which are arranged to afford a free passage of the fluid through the plates. The corresponding slits in the plates 10 and 12 are alined or substantially alined. The intermediate plate 11 is also provided with slits 14 which are, however, arranged above the plane of the corresponding slits 13 in the plates 10 and 12.

The outer surfaces of the plates 10 and 12 have strips 15 formed thereon, which strips act to space the separator from the adjacent plates. In this form of the separator however, there are no separating means between the plates. However, there are sufficient spaces between these plates to permit the flow of the fluid.

It may be sometimes desirable, however, to provide larger spaces between the plates of the separator and when this is the case, I construct the separator, as illustrated in Fig. 3. Here the plates 10', 11' and 12' are arranged in much the same relation as the plates 10, 11 and 12. The outer plates 10' and 12' are provided with alined slits 13' and the intermediate plate 11' is provided with slits 14' arranged out of alinement with the slits 13'. The outer surfaces of the plates 10' and 12' have spacing strips 15' thereon, and both faces of the intermediate plate 11' have spacing strips 16'. The strips 15' act to space the separator from the plates of the cell and the strips 16' space the plates of the separator. Thus the spaces 17' between the plates are enlarged.

When either form of the separator is used in a secondary battery the fluid, in its travel, will pass through the slits in the outer plates and through the corresponding slits in the intermediate plate, the fluid traveling between the outer plates and the intermediate plate in its passage from the slits in the outer plate to the slits in the intermediate plate. Thus the separator will offer no considerable resistance to the travel of the fluid, and yet the active material will be held in place on the plates and the active material which becomes free will be thrown down and prevented from passing through the separator. Furthermore, there will be no collection of the material on the separator and consequently no short circuiting of the cell.

While I have described the separator as consisting of three plates, it is to be understood that the number of plates may be varied, the only requirement being that the slits be arranged in the relation above described and claimed.

What I claim is:—

1. A separator consisting of a series of plates having slits therein, the slits in the outer plates being out of alinement with the slits in the intermediate plate.

2. A separator consisting of a series of plates having horizontally arranged slits therein, the slits in the intermediate plate being arranged above the corresponding slits in the outer plates.

3. A separator consisting of a series of plates arranged with their faces contiguous, said plates having slits extending horizontally therethrough and arranged in staggered relation.

4. A separator consisting of a plurality of plates having openings therein, the openings being arranged in staggered relation.

In testimony whereof I affix my signature.

JOSEPH O. LUTHY.